April 12, 1966  G. D. HANCHETT  3,246,182
ELECTRONIC TIMING SYSTEM FOR AUTOMATIC MACHINE OPERATIONS
Filed Dec. 26, 1962   4 Sheets-Sheet 1

INVENTOR.
GEORGE D. HANCHETT
BY Eugene M. Whitacre
ATTORNEY

April 12, 1966  G. D. HANCHETT  3,246,182
ELECTRONIC TIMING SYSTEM FOR AUTOMATIC MACHINE OPERATIONS
Filed Dec. 26, 1962  4 Sheets-Sheet 2

INVENTOR.
GEORGE D. HANCHETT
BY Eugene M. Whitacre
ATTORNEY

April 12, 1966  G. D. HANCHETT  3,246,182
ELECTRONIC TIMING SYSTEM FOR AUTOMATIC MACHINE OPERATIONS
Filed Dec. 26, 1962  4 Sheets-Sheet 3

INVENTOR.
GEORGE D. HANCHETT
BY
Eugene M. Whitacre
ATTORNEY

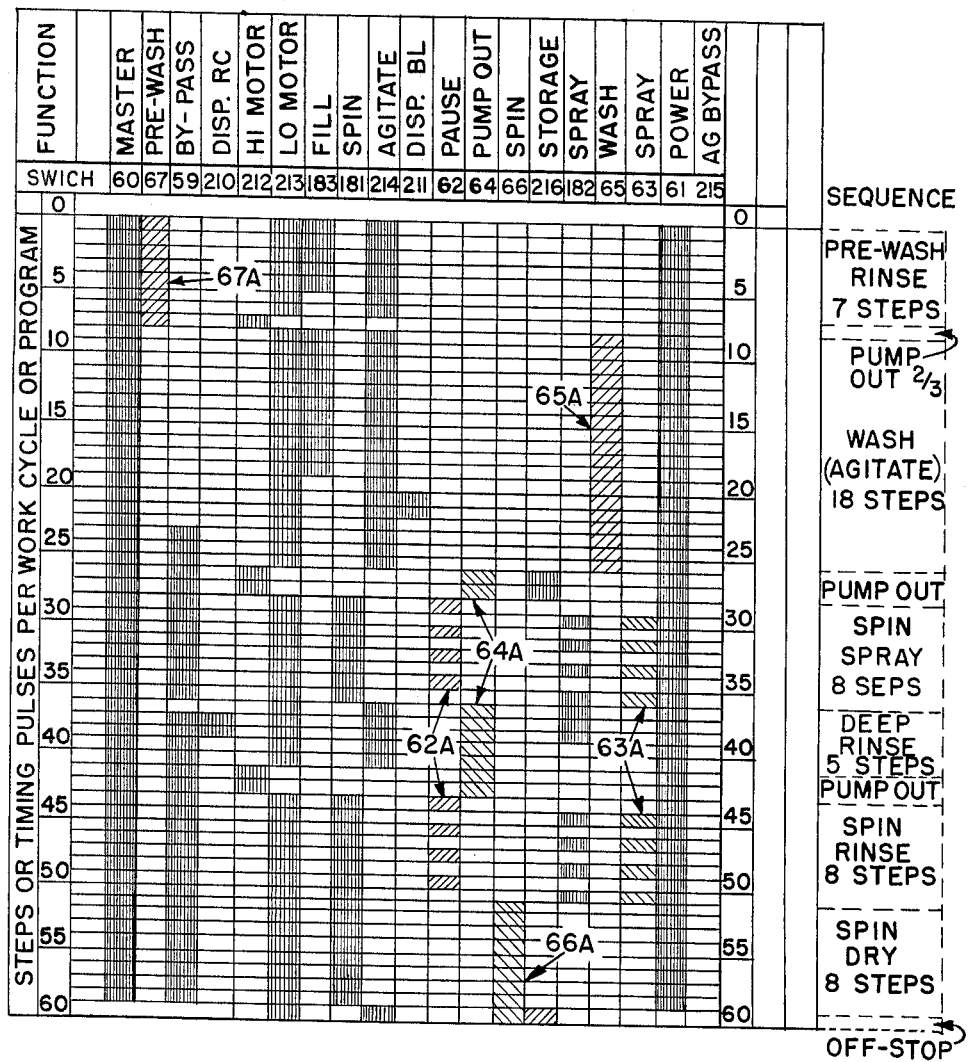

United States Patent Office 3,246,182
Patented Apr. 12, 1966

3,246,182
ELECTRONIC TIMING SYSTEM FOR AUTOMATIC MACHINE OPERATIONS
George D. Hanchett, Summit, N.J., assignor to Radio Corporation of America, a corporation of Delaware
Filed Dec. 26, 1962, Ser. No. 247,015
9 Claims. (Cl. 307—141)

The present invention relates to electrically-operated machines and equipments for automatically carrying out a series of operations or functions in a predetermined duty or work cycle, and more particularly to electrical systems for controlling the operations or functions of such automatic machines and equipments by the switching of electrical control circuits therein.

Electrically-operated machines of the multi-function cyclic type, for which the present invention is particularly adapted, include modern electric automatic clothes washers and the like, for domestic and commercial use, wherein the number and sequence of operations or functions to be performed in any desired program or work cycle are selected or determined and set up for control by multi-position programming or sequential function control switch means in connection with suitable control circuits.

In currently available clothes washing machines, the control mechanism includes a rotary switch comprising a rotor or like operating element provided with cam or other suitable means for operating a plurality of fixed switch elements. The latter are sufficient in number, position and construction to electrically control desired operations or functions in proper timed relation or sequence as the rotor element is moved through one full 360-degree revolution, or other angular range of movement. The rotor element is driven by a synchronous motor, and a gear train is provided between the rotor and the motor to move the rotor from position-to-position at regular fixed time intervals.

Modern clothes washers provide different cycling characteristics for the different kinds of fabrics in use. If four types of cycles are desired each having a particular wash time, rinse time, spin dry time etc., then a given portion of the 360° revolution must be provided for each cycle. For example the first 90° of rotation may be for one kind of cycle the next 90° of rotation for another cycle etc.

It has been found that more than 60 steps per revolution of the function switch rotor element are not practical because of increased size and other design changes necessary to effect reliable and selective operation at each step. Thus where four different kinds of wash cycles are desired a 60-position switch provides only 15 positions or steps per cycle with a corresponding limitation in the number of functions or operations that can be included in one work cycle.

In known types of automatic washing machine design, the number of assigned steps per operation or function thus are fixed, as are the number and sequence of operations or functions. Without a variation in the timing relation, flexibility of operation for any one machine with mechanical timing is quite limited. Thus with the known type system, as many different types of function switches or switch mechanisms may be required for the manufacture of a line of washing machines each having slightly different cycling features. In addition, known types of control mechanisms limit the styling of a washing machine, because the location of the controls is dictated by the location and character of the function switch.

It is therefore an object of the present invention to provide an improved electronic system for variably controlling or setting the timing of one or more sequential functions in the operation or work cycle of a mechanism or machine having mechanical means through which such functions are normally held in fixed timed relation one with respect to the other.

The present system is thus readily adapted to the control of modern automatic clothes washers and the like, and provides a high degree of flexibility in the timing of the operations or functions and the overall work cycle.

In accordance with the invention, an electronic timing system is provided for an automatic mechanism or machine which may be controlled or set by adjustments or changes in D.-C. control voltages related to the functions to be controlled or programmed into a work cycle in a predetermined sequence, in connection with a function switch.

Instead of changes in the rotor design, such as the cam design, in the function switch, changes in D.-C. control voltages in an electronic timing control or clock circuit is all that is required in conjunction with a pulse-responsive drive motor for the function switch. Thus, further in accordance with the invention, an electronic timing control circuit and a solenoid-operated driver replace the synchronous motor and gear train. The electronic timing control circuit may further include a D.-C. voltage divider for control voltages and a relatively simple and low-cost transistor timing circuit for developing pulses at a controlled rate to drive reliable and relatively simple solenoid or ratchet motor means.

A large degree of flexibility in the machine design is offered with the electronic system because the time length or interval between successive steps of the function control switch can readily be controlled. In one embodiment of the invention, control is obtained by the selection of a resistor or the setting of the potentiometer in the control circuit. With a mechanical system alone, to change from one set of operations to another requires a redesign of the complicated switch means, notably the cam elements for operating the individual switch elements in timed relation. Furthermore, the number of cycles which can be provided with the mechanical system alone is limited to about four per revolution of the switch drum or rotor without getting into an expensive mechanism whether by way of enlarged diameter or size, or by miniaturization of switch elements, and thus tending to reduce reliability in operation.

The electronic system is adaptable to provide an infinite number of different cycles by the application of proper control voltages to a timing or clock circuit. A single standard function switch of fixed design may thus be practical for variable timing and control of machines and equipments which operate with a predetermined work cycle consisting of successive or sequential functions or operations, like an automatic clothes washer.

The invention will, however, be better understood from the following description of certain embodiments thereof, when considered with reference to the accompanying drawings, and its scope is pointed out in the appended claims.

Figure 1:
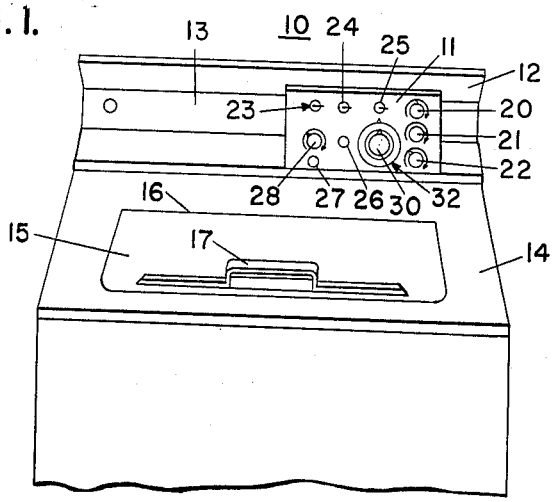
Figure 2:
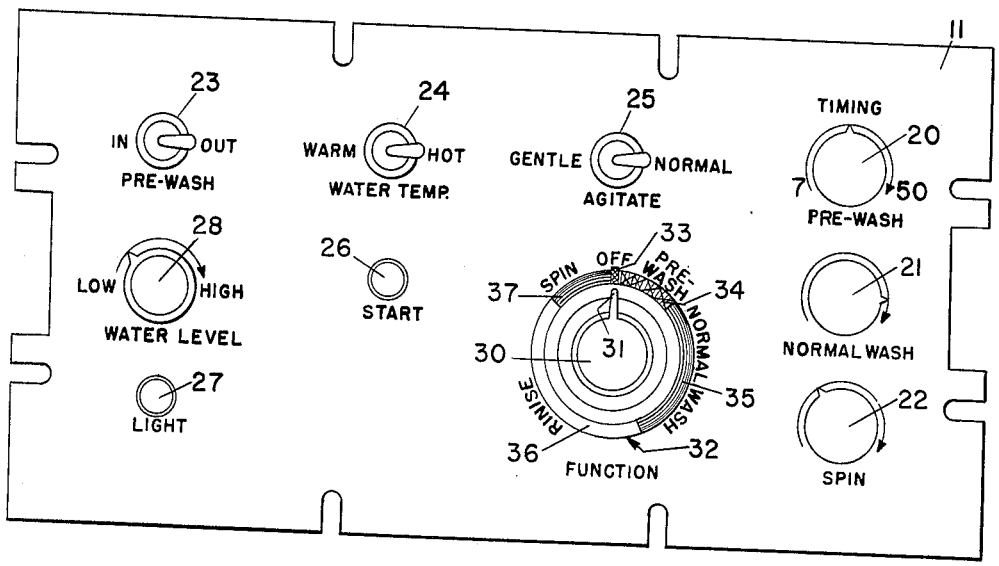
FIGURE 2 is a front view of an operating panel of the machine of FIGURE 1 showing certain of the control elements thereof in accordance with the invention.
Figure 3:
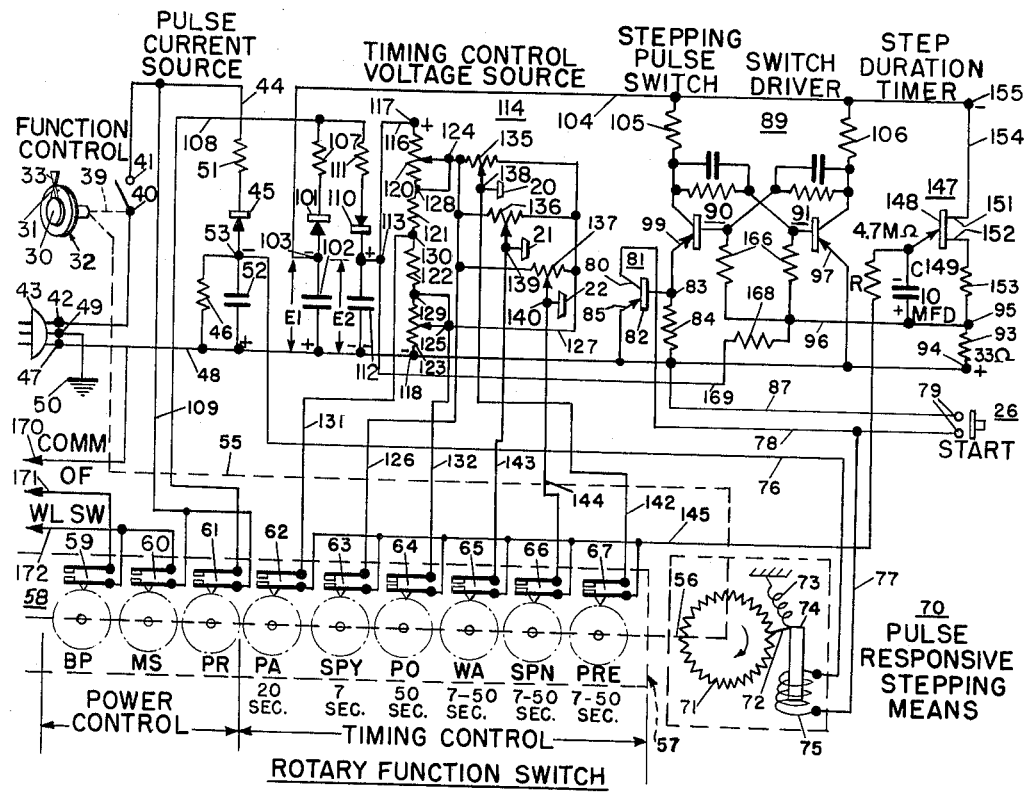
FIGURE 3 is a schematic circuit diagram of an electronic timing control system embodying the invention, as provided in conjunction with the machine of FIGURES 1 and 2.
Figure 5:
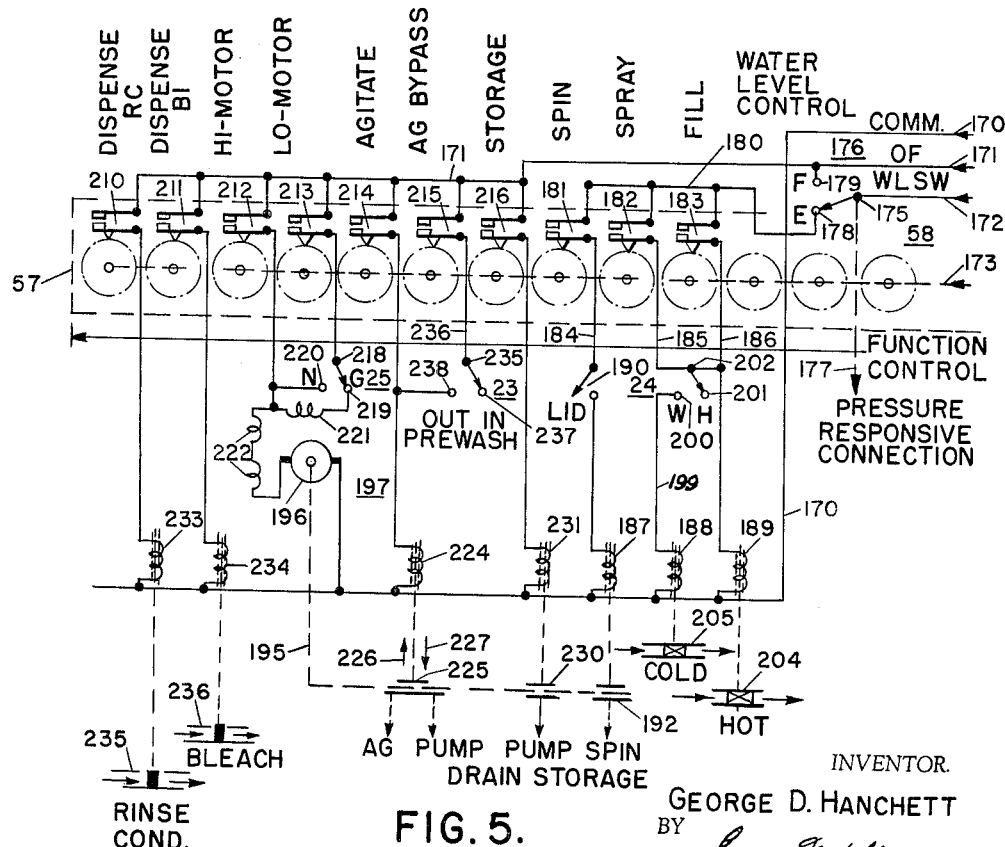
FIGURE 5 is a further schematic circuit diagram of the functional elements of the machine of FIGURES 1 and 2 and forming, with the circuit of FIGURE 3, the overall control system for the machine.

In the drawing, FIGURE 1 is a top view, in perspective, of an automatic washing machine provided with an electronic timing control system embodying the invention;

FIGURE 6 is a chart showing the relation between the operational steps for the work cycle of the machine of FIGURES 1 and 2 and the switch operations of the circuits of FIGURES 3 and 5 for the various functions provided by the control system.

Referring to the drawings, wherein like elements in the various figures are designated by like reference numerals and characters throughout the various figures, and referring more particularly to FIGURES 1 and 2, an automatic washer 10 is shown, representing a type of machine for automatically carrying out a series of operations or functions in a predetermined duty or work cycle, and for which the control system of the present invention is particularly adapted. In the present example, the machine 10 is provided with a control panel 11 mounted on a suitable back plate 12, a translucent portion 13 of which is adapted to be illuminated by an internal panel lamp (not shown). The top 14 of the machine 10 is provided with the usual washer-spinner compartment cover 15 hinged at the rear edge 16 and controlled by a lift handle 17 at the forward edge as shown.

As shown more clearly in FIGURE 2, the panel 11 includes various control elements in accordance with the invention. Particular attention is directed to the three control knobs 20, 21 and 22 arranged in vertical alignment on the right side of the panel and designated as "Prewash," "Normal Wash" and "Spin," respectively, by the legends associated therewith on the panel. These control elements are used in adjusting the timing of the operations or functions designated, as will hereinafter appear.

The panel also includes various manually-operable switches which may be of the toggle type indicated at 23, 24 and 25 and located for convenience along the top of the panel and substantially in alignment with the knob 20. The legends on the panel in connection with these switches may be noted and will hereinafter be referred to. The panel also includes a start button or switch 26 and a light button or switch 27, the latter being for turning on the illumination in rear of the translucent portion 13 of the back plate. A water level control knob 28 is provided on the panel at the left edge thereof as shown, for setting the height of the water level in the machine. This may be of any suitable type such as the conventional variable-pressure type.

The main control element of the panel is the function control knob 30 which is provided with a pointer 31 and rotates with respect to a fixed dial or dial element 32 on which the various desired operations or functions of the machine are designated both in position and angular width or disposition. In the present example, an OFF position designated by the mark 33 is provided on the dial element 32 to which the pointer 31 is moved when the machine is not in operation. In a clockwise direction from the OFF position is a "Pre-wash" angular range or segment 34 of the dial element, followed by a larger angular range or segment 35 and designated "Normal Wash." Progressing in the clockwise direction, in which the knob 30 and pointer 31 normally move, a relatively-wide angular range or segment 36 is designated for the "Rinse" function or operation which is followed by a narrower angular range or segment 37 for the "Spin" operation or function.

Referring now to FIGURE 3 along with the preceding figures, it will be seen that the function control knob 30 is connected, as indicated by the dotted line 39, with the operating arm 40 of a power switch having a contact 41 which the arm contacts when the switch is closed. In the drawing the switch is shown in its open position to which it is moved when the control knob 30 is pushed inwardly toward the dial. When the knob is pulled outwardly from the panel the switch 40–41 is closed. This is the main or line switch for the machine, and provides a connection from one terminal 42 of a power supply line plug 43, through the switch 40–41 to a power supply lead 44.

A rectifier circuit is connected with the lead 44 and includes a rectifier 45 having an output resistor 46 connected back to the low side of the supply line to complete the circuit. A second line plug terminal 47 is connected with the resistor 46 through a common power supply lead 48 in the control system. A third terminal 49 in the plug 43 is connected to the common ground 50 or chassis for the control system, as well as the metallic structure of the machine. The plug 43, as the power supply plug for the machine, may be plugged into any suitable power outlet (not shown) as is understood, and which may be considered to provide 117 volt A.C. in the present example.

The rectifier 45 is provided with a series voltage-dropping input resistor 51 and is connected with a storage capacitor 52 which is of relatively high capacity such as 500 mfd. for example, in the present circuit. This is parallel connected with the output resistor 46 between a supply or output terminal 53 and the common circuit lead 48. The rectifier 45 is poled to provide a negative potential at the terminal 53 with respect to the common lead 48, and applies a potential to the capacitor dependent upon the relative resistances of the resistors 51 and 46 in the voltage divider network provided. In the present example, these resistors are substantially equal thereby to provide substantially a 40 volt negative output at the supply terminal 53 with respect to the common lead 48. With this circuit, the rectifier 45 and the output terminal 53 are energized when the control knob 30 is pulled forward to close the line switch 40–41.

The function control knob 30 is also connected, as indicated by the dash line connection 55, with the operating shaft 56 of a rotary function control switch 57 for the machine. The function switch is provided with a rotor 58 which includes a series of cam elements designated by their functional or operational use in the system, from left to right in the circuit diagram, as BP (By-pass), MS (Master switch), PR (Power), PA (Pause), SPY (Spray), PO (Pump Out), WA (Wash), SPN (Spin), and PRE (Pre-wash). Each of these cam elements is arranged to operate a switch element in a predetermined timing relation according to the function or operation pattern of the duty or work cycle of the machine for which the switch is provided. Such a pattern will hereinafter be considered for the work cycle of an automatic washing machine as an example. It is to be understood that the rotor may be detened to provide positive stop position.

Each of the cam elements designated operate respectively open circuit switch elements 59, 60, 61, 62, 63, 64, 65, 66 and 67. The switch elements 59, 60 and 61, together with their cam or like operating elements in the rotor, constitute a power control section or group for the machine, while the switch elements 62–67 inclusive, together with their cam or like operating elements in the rotor, constitute a timing control section or group for the timing system. These sections are indicated by suitable legends.

A further section or group of switch elements in the function switch, together with operating elements in the rotor, are further provided to control the machine functions of the particular machine, and such additional function control section is further shown in the drawing and will hereinafter be described. While the switch elements of the function switch may be of any number of poles and may be arranged to operate either from open circuit or closed circuit positions, in the present example it may be understood that all of the switch elements are of the single-pole open-circuit type adapted to be closed in response to operation by the respective cam or other operating elements of the switch rotor.

Instead of synchronous motor or other constant speed means for driving the rotary function switch 57, pulse-responsive stepping means 70 is provided preferably, as indicated, in the form of a solenoid-operated or ratchet-type motor. This comprises the usual ratchet wheel 71 connected with, or mounted on, the switch drive shaft 56 as indicated, and a driving pawl 72 engaging the wheel under control of a suitable return or retracting spring 73. The pawl 72 is connected with the operating plunger 74 of a solenoid operating coil or winding 74, which, when energized, operates the plunger 74 to move the pawl 72 sufficiently to advance the ratchet wheel 71 one position or step of the rotary function switch 57. Ratchet motors of this type are well known and any suitable type may be used to effect the step-by-step operation of the switch shaft in response to current pulses applied to the operating coil 75.

The current pulses for operating the pulse-responsive stepping means 70 are derived from the pulse current source provided by the rectifier circuit and the storage capacitor 52, through a supply lead 76 connected with the negative supply terminal 53. The solenoid winding 75 is connected back through a return lead 77 to a branch lead 78 which is connected with one of the terminals or contacts 79 of the push-button starting switch 26. The opposite end of the lead 78 is connected with the collector 80 of a current-amplifier transistor or stepping pulse switch 81. This transistor is provided with a base 82 having an input terminal 83 connected to the common lead 48 through the transistor and a base resistor 84, the emitter 85 being connected directly to the common lead, as indicated.

The starting switch 26 is normally in the open circuit condition and, when closed, operates to complete a circuit from the lead 78 through a lead 87 to the common circuit lead 48 and thence back to the positive terminal of the storage capacitor 52 of the pulse-current source. When the capacitor 52 is charged, a current pulse is thus delivered through the solenoid winding 75 to operate the stepping means through one step.

Likewise the stepping pulse switch, provided by the transistor or current amplifier 81, permits the same pulse type of current flow when the transistor is turned on by a control voltage applied across the resistor 84 at the terminal 83, as will hereinafter be described. By successively applying and cutting off the control voltage at the terminal 83 with respect to the common lead 48, the stepping pulse switch means 81 is successively turned on to discharge the capacitor 52 and provide a driving pulse for the stepping means 70, and turned off to open the solenoid circuit and permit the capacitor 52 to store a fresh charge.

The alternate OFF and ON operation of the stepping pulse switch is provided at a controlled rate whereby the supply source is permitted time to charge and then discharge with a high current pulse to insure a positive and full stepping operation of the function switch 57. Thus the stepping pulse switch is arranged to be operated by a switch driver circuit 89 of a reliable and stable flip-flop type, such as two transistors 90 and 91 arranged in a suitable conventional circuit of the type indicated, with the current amplifier 81 connected in one side thereof and with a pulse supply source connected in the opposite side thereof to provide operating pulses thereto.

In the present example a resistor 93 of relatively low resistance as indicated is connected as the pulse voltage source, between a positive terminal 94 on the common lead 48 and a negative terminal 95 connected with a lead 96 to which the bases of the flip-flop circuit transistors are returned as indicated. The input emitter 97 of the flip-flop circuit is connected to the common lead as indicated, and thus signal pulses from the source 93 at the terminals 94 and 95 are applied between the bases and the emitters of the transistors 90 and 91, with the terminal 83 connected with the output emitter 99.

Operating voltage for the transistors 90 and 91 is provided by a suitable supply source including a diode rectifier 101 connected with a supply capacitor 102 and poled to provide a negative potential at a supply terminal 103 across the capacitor with respect to the common lead 48 which is thus at a positive potential, as indicated, in this supply circuit. The supply voltage across the capacitor 102 is indicated as E1 and will hereinafter be referred to by this designation. A negative supply lead 104 is connected with the supply terminal 103 and to this lead are connected the collector circuit resistors 105 and 106 of the flip-flop circuit 89.

A series voltage-dropping resistor 107 is connected in circuit with the rectifier 101 whereby the D.-C. output or supply voltage E1 is substantially 20 volts in the present example when connected with 117 volts alternating current supply. In the present system, for this purpose, the series resistor 107 is connected to a supply lead 108 which is connected through the switch section 61 of the function switch and back through a series connection lead 109 to the alternating-current or power supply lead 44 and the line switch 40–41. Thus when the line switch and the power switch 61 are closed, negative operating potential is applied to the lead 104 with respect to the common lead 48 and the switch driver or flip-flop circuit 89 is thus energized at the operating potential E1.

Also connected between the supply lead 108 and the common lead 48, substantially in parallel relation to the series rectifier circuit above described, is a second voltage supply or rectifier circuit comprising a diode rectifier 110 connected with the lead 108 through a voltage-dropping resistor 111 and, on the opposite side, connected through a storage or supply capacitor 112 with the common lead 48, thereby to provide a second source of potential or operating voltage E2 at the capacitor 112 and between an output terminal 113 and the common lead 48. Across this supply source is connected a voltage divider resistor network 114 which, together with the rectifier circuit provides a timing control voltage source having a plurality of output connections or taps, some of which may be fixed and other of which are variable for timing control purposes in accordance with the invention as will now be described.

It may be assumed by way of example that the supply voltage E2 across the capacitor 112, or between the terminal 113 and the common lead 48, is substantially 100 volts. The rectifier 110 is poled so that the terminal 113 is positive with respect to the common lead, as indicated, thereby effectively placing the two supply sources, and the supply voltages E1 and E2, substantially in series aiding relation between the terminals 103 and 113. The latter terminal is connected through a lead 116 with a positive terminal 117 of the network 114, the opposite terminal 118 of which is connected with the common lead 48.

In the present example the divider network includes four resistor sections 120, 121, 122 and 123 connected serially, in the order named, between the terminals 117 and 118. In the present example these may be considered to have resistance values of substantially 1,000, 30,000, 10,000 and 100 ohms respectively. The resistor sections 120 and 123 are provided with adjustable contacts 124 and 125 respectively, whereby the respective resistance values may be varied to provide an upper positive potential limit at the terminal 124 and a positive supply lead 126, and a lower positive potential limit at the terminal 125 and a positive supply lead 127 connected therewith, both potentials being with respect to the terminal 118 and the common lead 48 connected therewith.

The adjustable contacts 124 and 125 thus provide variable connections with the voltage divider resistor circuit that may be set when the desired upper and lower positive potentials are established thereby, and then remain substantially fixed in operation as will be seen hereinafter. They are effectively adjusted with respect to fixed tap connections between the resistor sections 120 and 121 at a terminal 128 and between the resistor sections 122 and 123 at a terminal 129 as indicated in the circuit diagram of the present example.

The contact 124 may be moved to increase the positive potential at the tap 128 and the supply lead 126 with respect to the common lead 48 and the terminal 118. Likewise the contact 125 may be moved to decrease the positive potential at the tap 129 and the supply lead 127 with respect to the terminal 118. This establishes limits in the voltages between the leads 126 and 127 and the terminal 118, and in the timing, as also will hereinafter appear. A third fixed tap 130 provided between the resistor elements 121 and 122 is connected with a voltage supply lead 131 which, in turn, is connected to one terminal of the switch element 62 of the timing control section of the function switch. It will also be noted that the supply lead 126 is connected to one terminal of the switch section 63, and the lead 127 is connected through the terminal 125 and a lead 132 with one terminal of the switch section 64.

The control voltages at the leads 126, 131 and 132 of the voltage divider network are thus substantially fixed. Connected between the leads 126 and 127 are three potentiometer resistors 135, 136 and 137 in parallel relation. These include movable potentiometer contacts 138, 139 and 140 respectively providing three variable output voltages. In the present system the contacts are connected respectively with the control knobs 20, 21 and 22 on the operating panel. The control voltage output connections for the contacts 138, 139 and 140 are made through output leads 142, 143 and 144 with one contact of each of the switch elements 67, 65 and 66 respectively, as indicated.

All of the switch sections 62-67 are connected at their remaining contacts in parallel relation to a common control voltage output lead 145 through which different timing control voltages as derived from the timing control voltage source are applied, with respect to the common lead 48, to a step duration timer or clock means in circuit with the resistor 93 to apply current pulses thereto for operating the switch driver 89 and the switch 81.

The timer includes a uni-junction transistor 147, and a timing resistor R and timing capacitor C in circuit therewith. The transistor comprises a bar or body 148 of semiconductor material having a rectifying contact or emitter 149 connected therewith and first and second bases provided by ohmic contacts 151 and 152 respectively. A voltage-dropping resistor 153 is connected between the second base 152 and the terminal 95, thereby effectively connecting the second base with the positive terminal 94, while the first base 151 is connected through a lead 154 with a terminal 155 on the negative supply lead 104.

The transistor is thus connected with the potential source providing the operating voltage E1. The timing capacitor C is connected between the emitter 149 and the lead 96 or the terminal 95. This circuit effectively connects the capacitor C in series with the timing voltage output resistor 93 to the common supply terminal 94. The capacitor C may have a value of 10 microfarads for example and the uni-junction transistor may be of the commercial type 2N1671A. The transistors 90 and 91 may be of the commercial type 2N406 and the stepping pulse switch transistor 81 may be of the commercial type 2N301. The timing resistor R may be considered to have a value of 4.7 megohms in the present example, and is connected between the emitter 149 and the positive timing voltage supply lead 145.

As the various switch elements 62-27 are closed, one at a time, by operation of the respective rotor elements designated, the different positive control voltages available at the designated fixed and variable supply terminals are applied to the capacitor C through the timing resistor R. Although other timer or clock means may be provided, the uni-junction transistor was found to exhibit stable firing voltage, relatively low firing current and stable negative resistance characteristic, as well as low cost.

As is known, the interbase resistance of a uni-junction transistor is normally between 5K and 10K ohms. The emitter is a single rectifying contact located near the second base 152. With no emitter current, the body of the transistor acts as a voltage divider so that a fraction of the interbase voltage appears at the channel side of the emitter. If the applied emitter voltage is less positive than the effective divider voltage at the emitter, the emitter is reversed biased and only a small leakage current will flow therefrom. If the emitter voltage is more positive than the effective divider voltage, then the emitter is forward biased and emitter current will flow providing a very low resistance to the first base 151.

When the emitter electrode 149 is driven positive, as by a positive voltage applied to the timing control lead 145, the emitter conducts, and a low resistance path is provided to the second base electrode 151. Thus, the voltage at the emitter electrode 149 becomes the same as that at the negative supply terminal 155, and the capacitor C is quickly charged to that voltage less any residual voltage drop across the small resistor 93.

Figure 4:
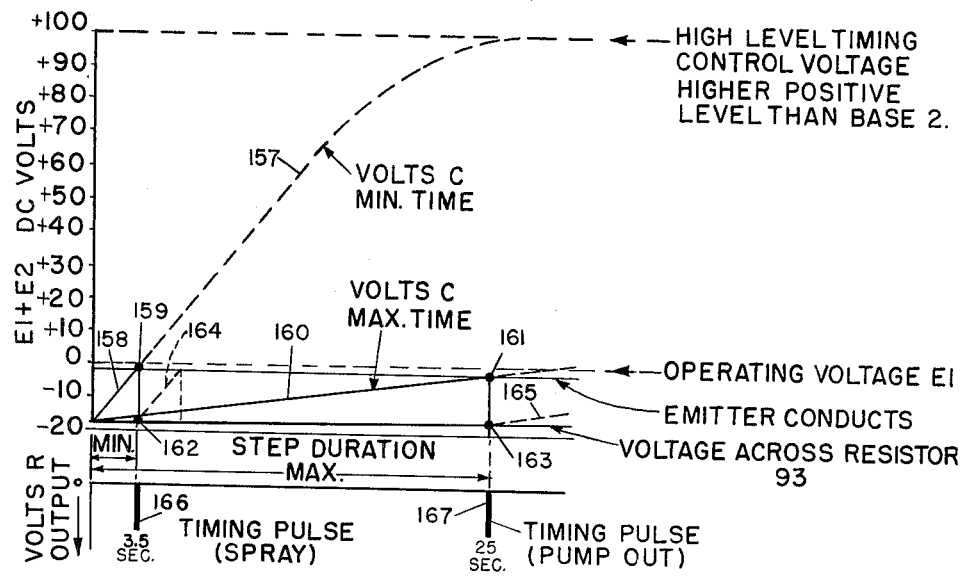
FIGURE 4 is a graph showing curves illustrating certain operating characteristics of the circuit of FIGURE 3.

Referring to the graph of FIGURE 4 along with FIGURE 3, the operation of the uni-junction transistor may further be considered. In the graph the dash line curve 157 plotted between time and D.-C. volts, comprising the supply voltages E1 and E2, indicates the discharge rate of the capacitor C when the timing resistor R through its timing control lead 145 is connected directly to the maximum available voltage such as at the terminal 117. Such a connection would be provided with the contact 124 moved to the terminal 117 and with the switch section 63 closed. The capacitor C would thus be discharged, and the potential of the emitter 149 would increase along the solid line 158 to a point 159, representing the point where the emitter conducts which is at a voltage of about 18 volts.

When the voltage control lead 145 is connected with the lower-most tap or terminal 125 through the lead 132 and the switch contact 64, a minimum positive voltage is supplied to the timing capacitor, and the discharge or reverse-charge rate may be lower as indicated by the line 160 in the graph. Thus the time duration until the voltage at the emitter 149 reaches the peak point at 161 is greater. With this consideration, a description of the operation of the circuit as an effective step duration timer is as follows:

With the line switch 40-41 closed by the control knob 30 and with the power switch 61 closed by the operation of the function switch rotor, operating voltages are applied to all of the transistors. The rectifier 101 and the supply capacitor 102 provide the negative potential E1 at the supply lead 104 required for operation of the transistors 147, 90 and 91. The rectifier 45 and the capacitor 52, in the pulse current source, supply the operating potential or current for the transistor 81 and the pulse responsive stepping means 70. The rectifier 110 and the capacitor 112 supply a positive potential E2 to which the timing capacitor C is discharged at various selected control voltage levels from the divider network 114. The amount or level of discharge voltage from the source or network is determined by which of the function switch elements 62-67 are closed in the timing control section.

Closing the contacts of the switch element 63 will thus apply the largest positive control potential to the control circuit lead 145 and will result in the shortest time interval. Similarly, closing the contacts of the switch element 64 will result in the lowest positive potential and the longest time interval. The switch elements 63 and 64, as well as the switch element 62, supply fixed potentials. Two are adjusted for the proper upper and lower time limits for a particular function of the machine by the adjustable contacts 124 and 125 for the switch elements 63 and 64. The switch elements 65, 66 and 67 apply potentials which can be varied between maximum and minimum values for timing the operations of the machine, through adjustment of the control knobs 20, 21 and 22.

Assuming that the timing capacitor C has just been charged by conduction of the transistor 147 and that the transistor 91 is conducting, then the transistors 90 and 81 are in a non-conducting state. This permits the capacitor 52 in the pulse current source to charge to its maximum value determined by the voltage divider 51–46. At the same time, the timing capacitor C will start, and continue, to discharge or as described with reference to FIGURE 4, through the timing resistor R until the potential on the emitter 149 reaches the conduction point, such as the points 159 and 161 which is approximately −2 volts.

The transistor 147 will then conduct and current, resulting from the voltage E1, will flow from the terminal 94 through the timer output resistor 93, thence through the capacitor C and the emitter 149 to the first base 151, and back to the negative supply line 104 through the lead 154 and the terminal 155. This will recharge the capacitor C with a current pulse to approximately 18 volts negative, with the polarity as indicated, and bring the emitter to a voltage indicated by points 162 and 163 for the curves 158 and 160. At this point the transistor 147 will stop conducting and the timing capacitor C will start to discharge again. The discharge rate will be along curves similar to the curves 158 and 160 respectively, and timed depending upon the applied voltage through the voltage divider network and the timing control switch elements 62–67. With the present system the timing may be considered to be set by the limit contacts 124 and 125 for from 3.5 seconds to 25 seconds as the respective time duration limits. This can be changed in several ways, such as by changes in the values of the RC timing circuit, and by adjusting the limit contacts.

During the charging of the timing capacitor C, the charging current flows as pulses through the 33 ohm output resistor 93 and thus applies negative pulses, of the type indicated at 166 and 167 in FIGURE 4, to the bases of the switch driver or flip-flop transistors 90 and 91 through the resistors 166 connected with the circuit 96. One pulse causes the transistor 90 to be turend ON or to conduct, and the conduction of the transistor 90 causes the transistor 91 to be turned OFF. Similarly, the transistor 90 upon conduction, applies a control bias to the base of the pulse switch transistor 81, thereby turning this transistor ON for conduction as a switch and discharging the pulse-current supply capacitor 52 through to solenoid winding 55 of the ratchet motor or stepping means 70. The latter then operates to advance the function switch one step or increment. Upon the next pulse from the step duration timer, the switch driver 89 turns OFF the stepping pulse switch 81 and permits the pulse-current source or capacitor 52 to recharge.

In the present example, the set time is from 7 to 50 seconds. The clock or step duration timer, therefore, operates the switch driver or flip-flop circuit 89 every 3.5 to 25 seconds depending upon the voltage applied through the timing circuit connection 145, and this in turn provides the switch stepping action every 7 to 50 seconds. As noted, the high timing limit is set by the contact 124 and the low timing limit is set by the contact 125 in the present example.

However, any other range of timing operation may be provided for any particular machine. The timing is such in any case, that, on each half cycle, the ratchet-operating capacitor 52, or pulse current source, must have time to recharge on the OFF half cycle of operation, and this important function is provided by the simple flip-flop switch driver circuit 89 in the system.

To insure effective and reliable switching action, a bleeder current connection is provided from base lead 96 through a series bleeder resistor 168 and a circuit lead 169 back to the positive supply terminal 113. This provides enough bleeder current through the 33 ohm output resistor 93 back to the common lead 48 to give a positive bias on the "OFF" transistor base for each half cycle so that it stays OFF.

The timing capacitor C in the emitter circuit of the uni-junction timing control transistor is thus discharged at a rate depending upon the amount of positive voltage applied through the high-resistance timing resistor R, and can be accelerated to the high degree indicated in FIGURE 4 by reason of the fact that the timing control circuit is returnable to an added potential source (E2) having a tapped voltage divider output resistor circuit with some of the tap points variable for different functions. The timing pulses across the step duration timer output-circuit resistor 93 are obtained each time the uni-junction transistor 147 conducts and charges the timing capacitor. These pulses actuate the flip-flop circuit which is coupled to the current amplifier 81. When this current amplifier conducts it discharges the (500 mmfd.) capacitor 52 through the solenoid winding of the stepping motor. The rate at which this operation continues and the timing of the function is therefore determined by the control voltage applied to the duration timer, thus obviating the necessity for a multiplicity of timing switches with different operating cam elements.

Referring now to FIGURE 5 along with FIGURE 3, the specific machine functions of the present example will briefly be considered. It will be seen that the two circuit diagrams are connected by a common lead 170, an "Other Functions" lead 171, and a "Water-Level Switch" lead 172. In addition the mechanical connection 173 of the control shaft 56 with the remainder of the rotor 58 of the function switch 57 is indicated. The lead 170 is connected with the common lead 48 for the system, whereas the leads 171 and 172 are connected respectively with one contact each of the switch sections 59 and 60. The lead 172 is also connected with the remaining contact of the switch section 59. The remaining contact of switch section 60 is connected with the power supply lead 109. With these connections, closure of the switch section 60, by operation of the function switch rotor, causes the circuit lead 172 to be energized along with the switch section 59 which, when closed, energizes the lead 171.

In the circuit of FIGURE 5, the lead 172 is connected with a movable contact 175 of a water-level control switch 176 which is connected, as indicated by the dash line 177, with pressure-responsive means (not shown) in the machine for actuating the switch at lower and higher water levels. This may be any suitable means as employed in machines of this type for operating a level switch such as the control switch 176.

The operation, in the present machine, is such that the switch is closed to a fixed contact 178 when the water level is low or at a minimum height, and is closed to a second fixed switch contact 179 when the water level is at a maximum height or above a predetermined level. In the present example these two conditions of the switch may be considered to be "Empty" and "Full" when the switch 176 is moved by the pressure responsive means to the positions indicated by the letter designations corresponding thereto.

The switch contact 178 of the water-level switch 176 is connected through a lead 180 with three switch sections 181, 182 and 183 in parallel. The switch sections, in turn, are connected through operating current leads 184, 185 and 186 to various current-responsive function-controlling elements in the machine, which in the present example, are represented as solenoids 187, 188 and 189 controlling the "SPIN," and "HOT" and "COLD" water "FILL" functions or operations in the machine wash cycle. Each of the solenoids are conected with the common lead 170 and the solenoid 187 is further connected with the lead 184 through a series two-point switch 190. The latter is operated from the closed position to the open position shown when the lid or cover of the machine is raised, to cut off the SPIN operation.

The solenoid 187 is connected, as indicated, with clutch means indicated at 192 for controlling the SPIN operation as one of the functions of the machine. As schematically represented in the drawing, the spin operation is controlled through the clutch means 192 from a drive shaft or like mechanical connection 195 with the rotor or armature element 196 of suitable electric-motor or like drive means 197.

The solenoid 189 is connected between the common lead 170 and the lead 186. The solenoid 188 is connected with the common lead and through a lead 199 with one fixed contact 200 of the switch 24, which is of the two-point type with the second fixed contact 201 disconnected. The switch lever 202 is connected to both leads 185 and 186 and may be moved to either one of the contacts shown to provide for "WARM" or "HOT" fill for the machine, as indicated. The solenoid 189 is connected to operate a hot-water valve 204, while the solenoid 188 is connected to operate a cold-water valve 205 of the machine.

With the switch 24 moved to the contact 201, or the "HOT" position, operation of either switch sections 182 or 183 serves to actuate the hot-water valve 204 alone when the water level switch 176 is in the position shown for a low water level or Empty. When the switch is moved to the contact 200 or "WARM" position, both solenoids 188 and 189 are energized when either of the switch sections 182 and 183 are closed, thereby providing a mixture of cold and hot water to provide a desired warm water fill or rinse action in the machine.

Due to the fact that all three of the switch sections 181, 182 and 183 are energized through the low-water-level contact 178 of the switch 176, these functions may not be activated when the switch 176 is in the full or high position, closed to the contact 179. In a like manner, it will be seen, the supply lead 171 is not energized except when the Bypass switch section 59 is closed or the water level switch 176 is in the full position with the arm 175 at the contact 179, assuming that the master switch section 60 and the line switch 40–41 are closed. These are functional operations and vary with different machines, as is understood. Thus, in the present example, the lead 171 is connected with further function control switch sections 210–216 in parallel relation, all being of the single-throw normally-open type in the present example.

The switch sections 212 and 213 are connected through the switch 25, which is of the two-point type, to control the operating motor 197 for gentle or slow operation as the contact arm 218 is moved to one point 219 and for normal or higher speed operation of the motor 197 when moved to the second point 220. This is indicated as controlling the field windings 221–222 of the motor as is conventional. When the "LO MOTOR" switch 213 is closed and the switch 25 in the "Gentle" position shown, the motor 197 operates at a reduced speed. The speed of operation is increased or set for "HI MOTOR" operation by movement of the contact arm 218 to the contact point 220 for the "Normal" position of the switch 25. It will be seen that the same speed of operation is obtained when the switch section 213 is open and the switch section 212 is closed.

The switch sections 214 and 215 serve to control a solenoid 224 which is connected directly with the switch section 214, and with the switch section 215 through the switch 23. Energization of the solenoid 224 by closure of the switch section 214 serves to operate a two-way clutch means 225 in one direction 226 to cause agitation or washer action from the motor 197. When the solenoid 224 is de-energized, the clutch means 225 is released in the opposite direction 227 to provide for driving pump means (not shown) for pump-out drain of the machine. The solenoid 224 may also be energized through the switch section 215 when the switch 23 is moved from the IN to the OUT position, as indicated in the circuit diagram. The clutch means 225 is released to normally provide continuous pump out or drain when the motor 197 is running and the solenoid 224 is de-energized.

When it is desired to pump-out the contents of the machine for storage instead of drain, a second clutch means 230 is provided in connection with an operating solenoid 231 connected with the switch section 216. The two remaining switch sections 210 and 211 in the present example are connected with solenoids 233 and 234 respectively. These are for operating any additional functional element of the machine, such as the application of suitable rinse conditioner through a gate-controlled conduit or dispenser means 235 connected with solenoid 233, and a similar gate-controlled conduit or dispenser 236 connected with the solenoid 234 for the application of bleach material, for example, to the machine.

For a further understanding of the functional operations of the present machine in response to varying control voltages, as an example of the manner in which a system in accordance with the invention may operate for the control of any series of functions or operations of a machine work cycle, reference is now made to the chart of FIGURE 6 along with the preceding figures. This chart shows the relation between the specific operational steps for the work cycle of the machine and the switch operations of the circuits of FIGURES 3 and 5 for the various functions provided by the control system.

In this chart the 60 switch positions are designated by horizontal lines numbered in steps of five from zero to sixty. As indicated in the chart, these are the steps or timing pulses per work cycle or program for the particular machine and represent the number of strokes of the ratchet motor or pulse-responsive stepping means 70 required to move the rotary function switch 57 through one 360-degree rotational or angular movement. During this movement, the cam elements of the rotor 58 operate the various switch elements in a predetermined sequence or relation at each step, as indicated by the shaded rectangular areas extending through the various stepping positions vertically on the chart in alignment with the functions or operations designated. The various switch elements which are actuated or closed during the successive stepping operations of the function switch are indicated in the box areas opposite the word "SWITCH" in the chart, and the shaded areas shown are thus indicative of the operating relation of these switch elements as the rotor is moved sequentially from position to position.

Referring to the Power Control group of switch elements 59, 60 and 61, it will be seen that the MASTER SWITCH including the switch element 60 is closed from the first position or stepping action of the function switch through to the 59th position, and is opened on the 60th position for turning off the machine automatically. Likewise, the POWER SWITCH including the switch section 61 is closed and opened over the same number of steps in the operation of the function switch.

Thus when the machine is in operation, the switch sections 60 and 61 are both closed and held closed except for the OFF position, when the control knob 30 and the pointer 31 are at the position 33 indicated on the control panel. The supply leads 44, 108 and 172 are, therefore, always energized when the machine is in operation. The lead 180 of FIGURE 5 is energized only when the water-level control switch is at the low contact 178 and the supply lead 171 is energized only when the Bypass switch contacts 59 are closed or the water level is sufficiently high to close the contacts 175–179 of the water level control switch 176.

On the chart it will be seen that the switch section 213 is closed for low-speed operation over most of the work cycle. The machine is filled with either hot or warm water depending upon the setting of the switch 24 when the contacts of the switch section 183 close through the various steps indicated. The switch section 214 operates for the washing function through the sequence of positions from the 8th through the 26th, and the 37th through the 41st positions and remains closed during the Off position 60 without any action.

The Spin operation likewise results from closure of the contacts of the switch element 181 through positions of the function switch indicated. The Storage operation controlled by the contacts of the switch section 216 occurs only during the 27th and 28th positions of the functions switch, and the Spray operations take place in spaced steps for the positions of the function switch indicated, according to the program or work cycle of the present example.

During certain ones of the operations, the Bypass contacts of the switch section 59 are closed, thereby to energize the supply lead 171 independently of the height of the water level from the 24th through the 36th position and from the 38th through the 59th position of the function switch. Dispensing of additional elements in the work cycle of the particular machine are provided by the switch elements 210 and 211 which operate to close respectively during the 38th, 39th and 59th positions, and the 21st and 22nd positions. The Agitate Bypass switch section 215 is operated only during the 8th position of the function switch, as indicated. These and other functions are related to the particular machine and need not be considered in detail. The sequence of operations provided by the various switches and their functional time relation is indicated in the dotted chart outline along the right side of FIGURE 6 and aligned therewith opposite the various steps concerned.

If each of the steps of the function switch were of equal duration, the timing relation would be substantially in proportion to the number of steps allocated to each function and would require a large number of different switching combinations to provide different washing cycles such as in the present example resulting from the requirements for different fabrics.

However, in accordance with the invention, the time duration of each step or series of steps for the different functions may be set to be different from others in the work or duty cycle, and thus change the timing relation of the various operations or functions and the resulting overall work or duty cycle. Thus in the present example a 20-second fixed time duration may be assigned and set for each step for one function or operation, a 7-second fixed time duration may be assigned and set for each step of a second function or operation, and a 50-second fixed time duration may be assigned and set for each step of a third operation, all as indicated in FIGURE 3. Also, the Wash, Spin and Pre-Wash functions, for example, may all be adjusted to have any time duration per step of the function switch of from 7 to 50 seconds in the system of the present example.

Referring again to the chart of FIGURE 6 along with the circuit diagram of FIGURE 3, it will be seen that the Timing Control functions are outlined in heavy lines for the operations of the switch sections 62, 63, 64, 65, 66 and 67. Likewise the rectangular blocks, for the various steps of the function switch, in alignment with these switch sections vertically in the chart are heavily shaded whereby they may more readily be perceived with respect to the functional operations, which concern only the particular machine.

It will be seen that the timing of the steps of the Pre-Wash operation controlled through the switch section 67, is set by the control knob 20, and may be assumed from the setting indicated to be substantially 30 seconds for each step of the rotary function switch. Thus by adjusting the knob 20 the timing steps represented by the area 67A provide for extending the Pre-Wash operation from approximately one minute to over six minutes. Likewise the normal wash timing set up by the switch 65 and represented by the area 65A covers 18 steps, each of which may have from 7 to 50 seconds time duration established, depending upon the setting of the control knob 21. This operation or function may thus be extended from approximately two minutes to 15 minutes.

The Spin cycle timing is determined by the adjustment of the control knob 22 and controlled through the switch element 66. This covers the 8 steps of the Spin-dry operation, as indicated by the area 66A, and may occupy a time interval of from slightly less than one minute to over six minutes, as above referred to for a previous operating function. The fixed control voltages for the step duration timer 147, derived through the switch sections 62, 63 and 64 from the fixed voltage supply leads 131, 126 and 132 provide respectively, for a 20-second, 7-second and 50-second time intervals for each operating step of the function switch controlled thereby as hereinbefore noted. These operational connections are made in the machine of the present example as indicated by the areas 62A, 63A and 64A in the chart.

The foregoing timing control operations are shown and described only by way of example as being one set of timing operations as established for the control of a particular machine. As is understood, for other electrically operated machines of the multi-function cyclic type, the number and sequence of operations or functions to be performed in any desired program or work cycle are selected or determined and set up for control by multi-position programming or sequential function control switch means, which may be of the rotary type shown and described, in connection with suitable control circuits. These control circuits and function control elements of the system are different for different machines or mechanisms to be controlled, and those shown in FIGURE 5 and referred to in FIGURE 6 are only by way of example to illustrate the operation of the invention which is concerned primarily with the circuit of FIGURE 3 for the timing control function and system for the machine.

The improved electronic system for a machine of the type shown and described or like multi-function cyclic machine, provides for variable controlling or setting the timing of one or more of the sequential functions or operations in the work cycle, thereby freeing the timing control of the functions or operations from the normal mechanical restrictions of conventional timing systems for such machines. As has been seen the timing operation is varied or changed by changing the duration of the incremental steps involved in the operational movement of the control element of a function switch, and this may be controlled or set merely by adjustments or changes in D.-C. control voltages related in amplitude or otherwise to the functions to be controlled or programmed into the work cycle.

Instead of mechanical changes in design, changes in the control voltages in the electronic control circuit, in conjunction with a pulse-responsive drive motor, provide for any desired timing relation for the operations of a machine in the present improved system. The present electronic system is adapted to provide an infinite number of different cycles by the application of different control voltages to the timing control circuit in connection with a single function switch means of substantially fixed design as a practical means for variably timing and controlling machines and equipments which operate with a predetermined work cycle consisting of successive or sequential functions or operations, like an automatic washer.

The alternation or change in any operation or function in the cycle can be accomplished by the simple rearranging of a voltage divider circuit in a reliable and simplified electronic timing system. Thus, with an automatic electric washer, the problem of new and different fabrics requiring different operations or functions in the work cycle may be met by the system of the present invention without appreciable added complication in design or costs.

What is claimed is:

1. In an electrically-operated machine for automatically carrying out a series of functions in a predetermined work cycle, the combination with a movable function control element therefor, of an electronic timing system comprising electrical pulse-responsive stepping means for actuating said function control element in incremental steps, and electrical means for energizing said stepping means at different time intervals in response to different applied control voltages including a switch connected with said control element and operable in step therewith for selectively applying said control voltages to said energizing means, a timing capacitor having a high-resistance leakage path with each of said control voltages selectively through said switch and a charging circuit including an emitter-to-first-base connection through a uni-junction transistor and a series charging resistor, an electronic stepping-pulse switch in circuit with said stepping means for off-and-on operation thereof, and a flip-flop circuit coupling said stepping-pulse switch with said charging resistor for response to the charging of said timing capacitor and operation of said stepping means periodically at said different time intervals.

2. In an electrically-operated machine for automatically carrying out a series of functions in a predetermined work cycle, the combination with a movable function control element therefor, of an electronic timing system for said machine functions and work cycle comprising, electronic circuit means including a uni-junction transistor circuit and a timing capacitor operative in response to different applied control voltages to provide electrical timing pulses at corresponding different time intervals, electrical pulse-responsive stepping means connected for moving said control element in incremental steps through a predetermined range of movement controlling said work cycle, a capacitive storage source of operating current for said stepping means separate from said timing capacitor coupled with said electronic circuit means for control thereby at different predetermined time intervals in response to said different applied control voltages, and means connected with said function control element for applying said different control voltages to said electronic circuit means at different steps, thereby to control and set the timing of said series of functions and said work cycle.

3. In an electrically-operated machine for automatically carrying out a series of functions in a predetermined work cycle, the combination with a movable function control element therefor, of an electronic timing system for said machine functions and work cycle comprising, electrical pulse-responsive stepping means connected for moving said control element in incremental steps through a predetermined range of movement controlling said work cycle, electronic circuit means including an electronic switch for controlling the application of operating current to said stepping means in off-and-on current pulses, a step-duration timer circuit controlling said switch and including a timing capacitor and a uni-junction transistor having a first base connected to a source of negative polarity and an emitter, means providing control voltages at different positive polarities with respect to said first base, and means including a series timing resistor for selectively applying said voltages to said emitter and capacitor in step with said control element, said capacitor being thereby discharged through said timing resistor at different voltage levels to vary the timing of said off-and-on current pulses.

4. In a machine for automatically carrying out a series of functions in a predetermined work cycle, the combination with a rotary multi-element function control switch, of an electronic timing system therefor comprising, a step-duration timer circuit including a uni-junction transistor having an emitter circuit and a timing capacitor connected therein, means providing a relatively high-level control voltage source including fixed and variable tapped voltage-divider resistor means, a series timing resistor connected with said emitter circuit and timing capacitor and selectively connected to said high-level control voltage source through said voltage-divider resistor means to control the rate of discharge of said timing capacitor following successive charging pulses of said capacitor through periodic conduction of said transistor, pulse-responsive stepping means connected to drive said rotary function switch and including a solenoid operating element, and means for applying an operating current pulse through said operating element in response to selected charging pulses of said timing capacitor.

5. The combination with a machine for carrying out a series of functions in a predtermined work cycle and having a rotary function control switch connected therewith, of an electronic timing system for said machine functions operative in response to different applied control voltages to change the duration of incremental steps involved in the operational movement of the rotary function switch and comprising, a solenoid-operated pulse-responsive stepping means for said switch, a capacitive storage source of pulse operating current for said stepping means, a step duration timer including a uni-junction transistor and a timing capacitor separate from said capacitive storage source for receiving charging pulses upon conduction through said transistor, means for applying pulse current from said source to said stepping means in response to said transistor conduction and charging pulses, and means for applying control voltage at different levels to said transistor for discharging said timing capacitor and causing said transistor to conduct at different time intervals, thereby to change the timing of the incremental steps in the operation of said function switch.

6. In a electrically-operated machine for automatically carrying out a series of functions in a predetermined work cycle, the combination with a movable function control element therefor, of an electronic timing system comprising, electrical pulse-response stepping means connected for moving said control element in incremental steps through a predetermined range of movement controlling said work cycle, a timing circuit including a uni-junction transistor having a first and second base and an emitter, a timing capacitor and a timing pulse output resistor connected serially in circuit between said emitter and a source of potential positive with respect to the first base, thereby to charge said capacitor with a current pulse upon conduction from said emitter to said first base, means including an electronic switch and a capacitive energy source separate from said timing capacitor connected for operating said stepping means in response to selected ones of said pulses, means including a selector switch connected with said movable function control element for applying control voltage to said emitter and said capacitor from higher positive levels than said second base, and a timing resistor in circuit between said switch means and said emitter and capacitor for controlling the rate of potential change at said emitter and the duration of the time interval between pulses from said timing circuit, and the stepping operation of said function control element.

7. In an electrically-operated machine for automatically carrying out a series of functions in a predetermined work cycle, the combination with rotary function control switch therefor, of an electronic timing system for actuating said switch in incremental steps at different time intervals and comprising, electrical solenoid-operated stepping means for said switch, means including a storage capacitor providing a pulse operating-current source for said stepping means, an electronic current amplifier connected between said source and said stepping means to control the flow of operating current thereto, a flip-flop circuit connected with said current amplifier to provide off-on operation thereof, a step-duration timer circuit having a timing capacitor and a series charging resistor therefor connected to apply input switching pulses to said flip-flop circuit and thereby operate said stepping means in response to alternate pulses, means including a selector switch operable in step with said control switch for discharging said timing capacitor to control voltages at different voltage levels, thereby to change the timing of the operation of said stepping means, and a uni-junction transistor connected in circuit with said timing capacitor and charging resistor to control the flow of charging current periodically and having an emitter connected to said capacitor for firing at different time intervals as said capacitor discharges to a predetermined level in response to said control voltages.

8. In an electrically-operated machine for automatically carrying out a series of functions in a predetermined work cycle, the combination with a rotary function control switch and operating circuits therefor, of an electronic timing system comprising, solenoid-operated stepping means for moving said control switch in incremental steps, means for energizing said stepping means including a pulse current source and an electronic stepping-pulse switch for applying stepping pulses thereto, a timing capacitor and series charging resistor therefor, a uni-junction transistor having a first base connected to a point of negative potential and an emitter connected to a point of positive potential serially through said timing capacitor and charging resistor, a discharge resistor connected to the junction of said emitter and timing capacitor, a voltage divider source providing a plurality of timing control voltages positive with respect to the potential of a second base of said transistor, means including a selector switch connected with said rotary function control switch and operative in step therewith for selectively applying said control voltages to said junction of the emitter and timing capacitor through said discharge resistor, and means coupling the charging resistor and said electronic switch for operating said switch successively off-and-on in response to successive charging pulses through said charging resistor, thereby to control and change the timing of said functions and work cycle.

9. In an electric automatic clothes washer having a rotary function control switch and operating circuits connected therewith for controlling in a predetermined sequence a series of functions or operations in the work cycle thereof, an electronic timing system therefore comprising, solenoid operated stepping means for moving said control switch in incremental steps through a predetermined angular range of movement covering said work cycle, electrical means for energizing said stepping means at different time intervals in response to different applied control voltages, thereby to provide changes in the timing of the functions or operations for effective washing of different kinds of materials, said electrical means including a switch connected with and operated in step with said function control switch for selectively applying said control voltages, a timing capacitor and a series charging resistor therefor, means providing a high resistor leakage path with each of said control voltages selectively through said last named switch, a charging circuit for said capacitor including an emitter-to-first-base connection through a uni-junction transistor and said charging resistor, and electronic stepping pulse switch in circuit with said stepping means for off-and-on operation thereof, and a flip-flop circuit coupling said stepping pulse switch with said charging resistor for response to the charging of said timing capacitor and operation of said stepping means periodically at different time intervals.

References Cited by the Examiner
UNITED STATES PATENTS 3,171,045 2/1965 Jacobs _____ 307—141
3,188,504 6/1965 Anderson _____ 307—141.4

ORIS L. RADER, *Primary Examiner.*

W. SHOOP, *Assistant Examiner.*